US007467454B2

(12) United States Patent
Durkos

(10) Patent No.: US 7,467,454 B2
(45) Date of Patent: *Dec. 23, 2008

(54) BOX SPRING STAPLER APPARATUS

(75) Inventor: Larry G. Durkos, Lebanon, IN (US)

(73) Assignee: Imaginal Systematics, LLC, Lebanon, IN (US)

( * ) Notice: Subject to any disclaimer, the term of this patent is extended or adjusted under 35 U.S.C. 154(b) by 78 days.

This patent is subject to a terminal disclaimer.

(21) Appl. No.: 11/143,403

(22) Filed: Jun. 2, 2005

(65) Prior Publication Data

US 2005/0210647 A1 Sep. 29, 2005

Related U.S. Application Data

(63) Continuation of application No. 10/306,231, filed on Nov. 27, 2002, now Pat. No. 6,935,546.

(60) Provisional application No. 60/334,196, filed on Nov. 29, 2001.

(51) Int. Cl.
*B23P 11/00* (2006.01)
*B27F 7/00* (2006.01)

(52) U.S. Cl. ............................ 29/432; 29/91.1; 29/798; 29/33 K; 227/110; 227/100

(58) Field of Classification Search ................. 227/139, 227/153, 152, 50, 30, 29, 28, 37, 40, 110, 227/100, 2, 5; 29/91.1, 33 K, 798, 700, 281.6, 29/432
See application file for complete search history.

(56) References Cited

U.S. PATENT DOCUMENTS

| | | | | |
|---|---|---|---|---|
| 2,169,433 A | | 8/1939 | Roy | |
| 2,755,470 A | | 7/1956 | Johnson | |
| 2,946,060 A | | 7/1960 | Powers | |
| 3,084,345 A | | 4/1963 | Hodges, Jr. | |
| 3,168,745 A | | 2/1965 | Winters | |
| 3,190,522 A | | 6/1965 | Winters | |
| 3,737,927 A | | 6/1973 | Kline et al. | |
| 3,753,404 A | | 8/1973 | Bryan, Jr. | |
| 3,770,180 A | | 11/1973 | Stumpf | |
| 3,789,495 A | | 2/1974 | Stumpf | |
| 4,152,558 A | | 5/1979 | Newman | |
| 4,518,907 A | | 5/1985 | Giguere | |
| 4,652,806 A | | 3/1987 | Aiello | |
| 4,876,787 A | | 10/1989 | Ditty et al. | |
| 4,929,879 A | | 5/1990 | Wright et al. | |
| 4,995,087 A | | 2/1991 | Rathi et al. | |
| 5,052,064 A | | 10/1991 | Hagemeister et al. | |
| 5,054,178 A | * | 10/1991 | Zuger | 29/91.1 |
| 5,054,678 A | | 10/1991 | Nasiatka | |
| 5,083,073 A | | 1/1992 | Kato | |
| 5,194,791 A | | 3/1993 | Cull | |
| 5,321,353 A | | 6/1994 | Furness | |
| 5,361,434 A | * | 11/1994 | Hagemeister et al. | 5/247 |
| 5,422,835 A | | 6/1995 | Houle et al. | |
| 5,483,440 A | | 1/1996 | Aono et al. | |
| 5,497,541 A | | 3/1996 | Nogueira | |
| 5,533,146 A | | 7/1996 | Iwai | |
| 5,583,620 A | | 12/1996 | Miyamoto | |

(Continued)

*Primary Examiner*—Essama Omgba
(74) *Attorney, Agent, or Firm*—Baker & Daniels LLP

(57) ABSTRACT

A fastener apparatus is provided for securing a plurality of modules to a frame.

20 Claims, 6 Drawing Sheets

U.S. PATENT DOCUMENTS

| | | | | |
|---|---|---|---|---|
| 5,611,130 | A | 3/1997 | Rummell et al. | |
| 5,772,096 | A | 6/1998 | Osuka et al. | |
| 5,792,309 | A * | 8/1998 | Eto | 156/517 |
| 5,904,789 | A | 5/1999 | Durkos | |
| 6,220,494 | B1 | 4/2001 | Raffoni | |
| 6,935,546 | B2 * | 8/2005 | Durkos | 227/110 |
| 7,222,402 | B1 * | 5/2007 | Durkos | 29/91.1 |
| 2005/0251981 | A1 * | 11/2005 | Mossbeck et al. | 29/91.1 |

* cited by examiner

BOX SPRING STAPLER APPARATUS

This application is a continuation of U.S. application Ser. No. 10/306,231, filed Nov. 27, 2002 now U.S. Pat. No. 6,935,546, which claims the benefit of U.S. Provisional Application Ser. No. 60/334,196, filed Nov. 29, 2001, both of which are expressly incorporated by reference herein.

BACKGROUND AND SUMMARY OF THE INVENTION

The present invention relates to a fastener apparatus for securing a module to a frame. More particularly the present invention relates to a fastener apparatus such as, for example, a stapler apparatus for assembly of a box spring or the like, automatically.

Conventional foundations or box springs which are used to support mattresses include a wood frame which supports a plurality of spring modules located at spaced apart positions on the wood frame. Some of these modules are coupled to a wire grid which forms the top surface of the box spring. Other spring modules are formed from a heavy gauge continuous wire which is bent to form vertically extending spring elements. Therefore, the term "module" as used herein is intended to cover any type of conventional support module configured to be coupled to a frame, such as a spring module used in box spring construction.

Bottom ends of the spring modules are typically stapled directly to the wood frame of the box spring. During conventional assembly of the box spring, a worker must manually staple each of the plurality of modules to the wood frame using an industrial stapler. Therefore, the manufacturing process is limited to the capability of the individual hired to staple the box spring to the modules.

U.S. Pat. No. 5,904,789, which is expressly incorporated by reference herein, discloses an apparatus designed to automate the module fastening process. The apparatus of the '789 patent invention includes a vision guided fastening apparatus which automatically locates the modules on the frame and then guides a fastener tool, such as a stapler, into proper position to secure the modules to the frame automatically. The '789 patent apparatus is designed to accommodate different size box springs, such as twin, full, queen, and king sizes. In addition, the apparatus is programmable to secure any type of module to the wood frame.

As discussed below, the present invention provides a fastener apparatus which does not require the vision guidance system of the '789 patent. The apparatus of the present invention includes a mechanical guide coupled to the stapler or other fastening tool. The mechanical guide guides the fastening tool into proper alignment with a target during the fastening process.

In an illustrated embodiment of the present invention, an apparatus is provided for securing a plurality of modules to a frame. The apparatus comprises a base for supporting a frame and a plurality of modules, a support, and a drive mechanism coupled to at least one of the support and the base. The drive mechanism is configured to provide relative movement between the support and the base. A tool is coupled to the support. The tool is configured to secure each module to the frame. The apparatus also includes a mechanical guide coupled to the tool. The mechanical guide is configured to engage the module to guide the tool to a target fastening location on the module.

The illustrated drive mechanism includes a controller configured to guide movement of the support relative to the base and the frame and modules located on the base, thereby moving the tool to secure each of the modules to the frame. The controller includes a memory for storing a plurality of standard positions for each of the modules on the frame and means for guiding the tool to the plurality of stored standard positions.

The illustrated mechanical guide includes a support coupled to the tool and first and second guide wings pivotably coupled to the support. The guide wings are each configured to engage the module as the tool moves toward the module to guide the tool to the target fastening location. In the illustrated embodiment, each of the guide wings includes first and second ramp surfaces configured to engage the module.

Additional features of the invention will become apparent to those skilled in the art upon consideration of the following detailed description of the presently perceived best mode of carrying out the invention.

BRIEF DESCRIPTION OF THE DRAWINGS

The detailed description particularly refers to the accompanying figures in which.

DETAILED DESCRIPTION OF DRAWINGS

Figure 1:
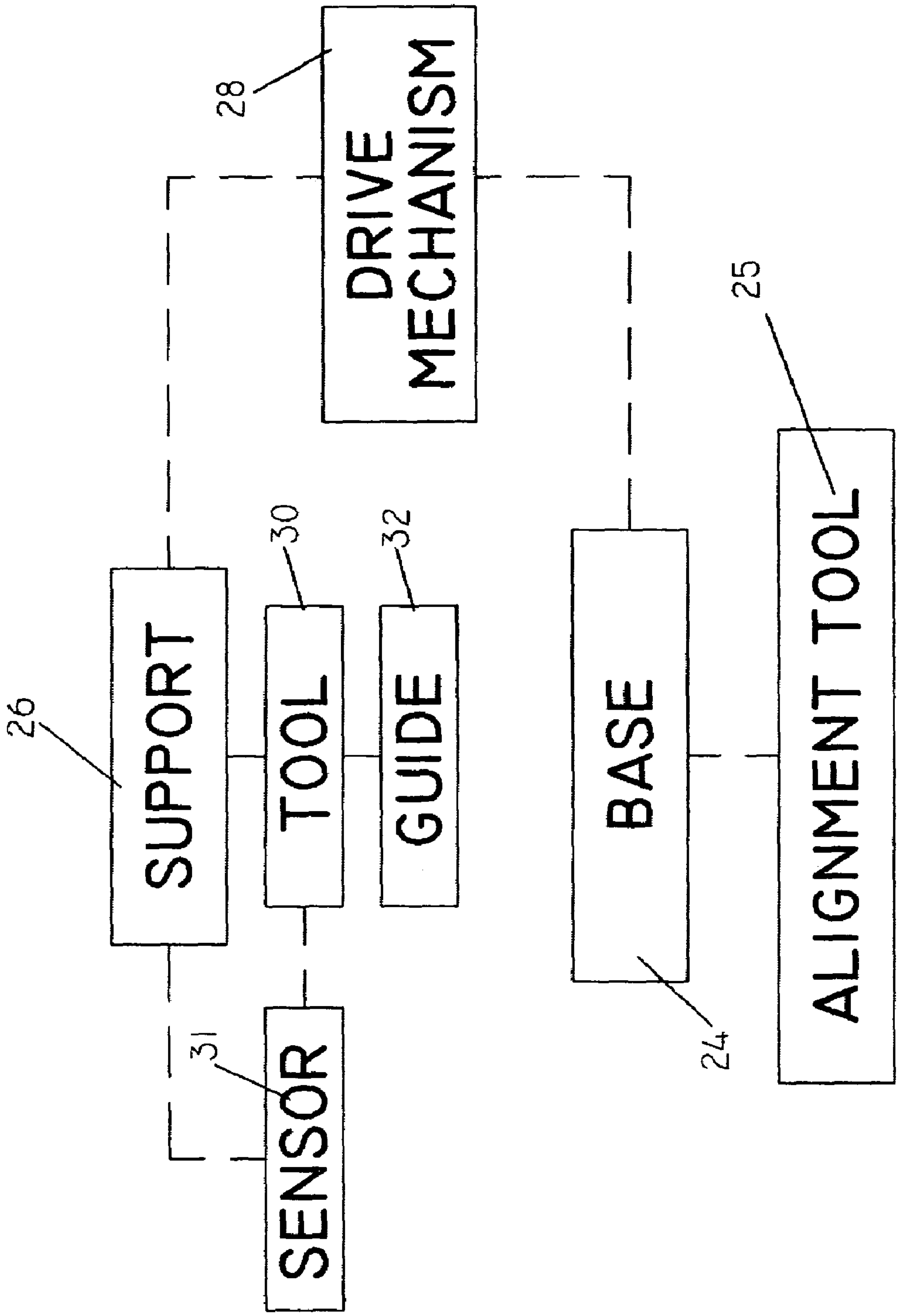
FIG. 1 is a block diagram illustrating components of a module fastening apparatus of the present invention.

Referring now to the drawings, the present invention is related to fastener apparatus for securing modules to a frame. The illustrated embodiment is a box spring stapler apparatus. A related apparatus is disclosed in U.S. Pat. No. 5,904,789 which is expressly incorporated herein by reference. The '789 patent discloses an apparatus and method using a vision guidance system for finding targets during the formation of box spring foundation units or other structures in which modules are coupled to frames. The prior system is very flexible and universal and provides vision targeting usable to form all types of box spring foundation units or other structures in which modules are fastened to frames.

Figure 2:
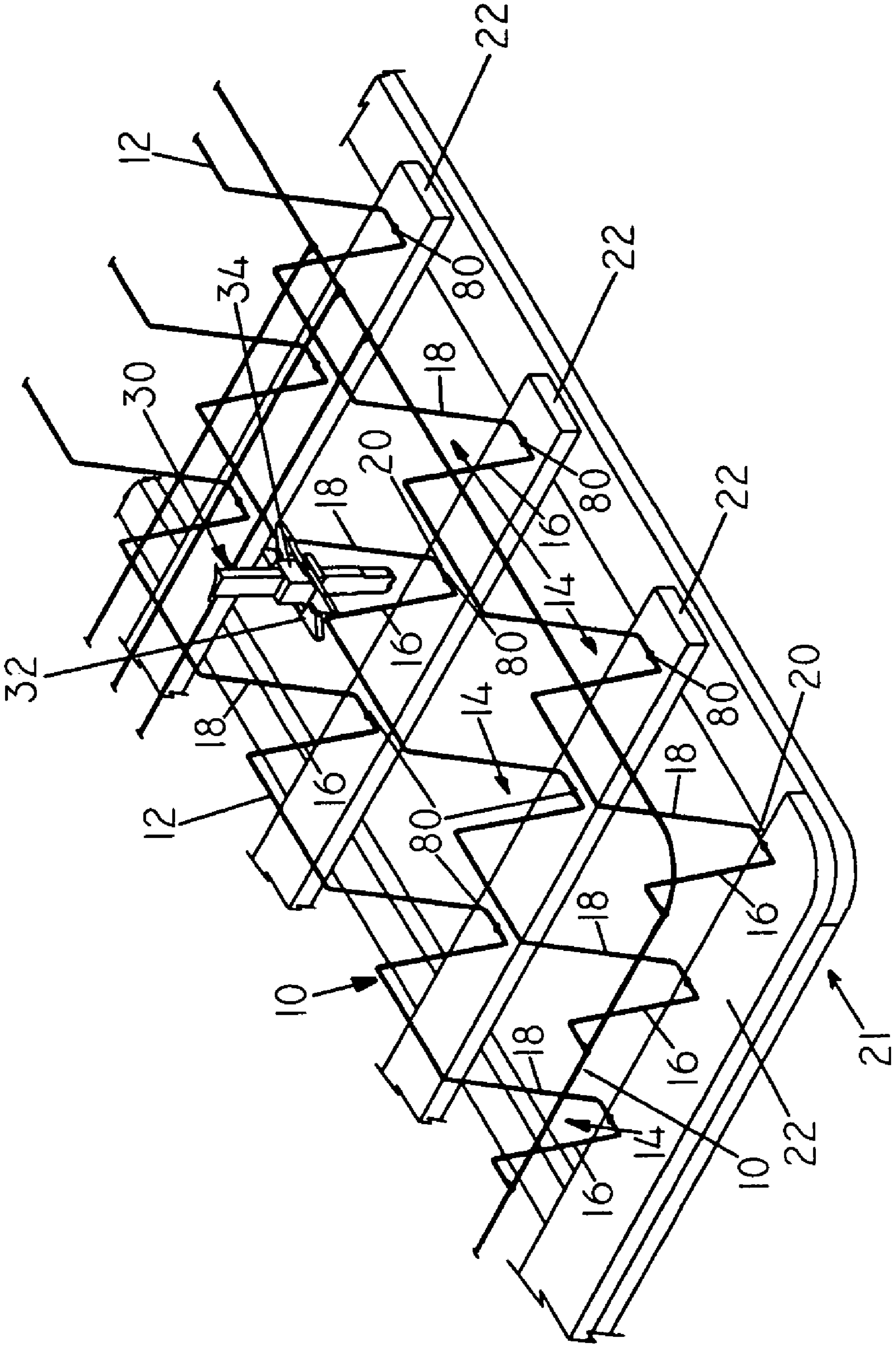
FIG. 2 is a perspective view illustrating one embodiment of a box spring including a wood frame and, a plurality of spring modules located on the wood frame, and illustrating a stapler having a mechanical guide of the present invention movable to fasten the modules to the wood frame.

Some box spring foundation units use a three dimensional wire weldment as the spring system for the box spring. One such unit is the Semi-Flex® box spring assembly illustrated in FIG. 2. A spring unit 10 includes a continuous wire having a top portion 12 and a plurality of troughs or spring modules 14. Each spring module 14 has first and second vertically extending side portions 16 and 18 and a horizontal bottom portion 20 located between the first and second vertically extending side portions 16 and 18. Bottom portion 20 abuts a section 22 of a wood frame 21. Several of the wires extend across the width of the box spring at spaced apart locations as shown in FIG. 2. Spring modules 14 are aligned with each of the wood frame sections 22 of the bottom frame 21 of the box spring.

As illustrated in FIG. 1, the present invention provides a base 24 for supporting frame 21 and plurality of spring units 10. A support 26 is located above the base 24. Support 26 holds a fastening tool 30 for securing the modules 14 to the frame sections 22. A mechanical guide 32 is coupled to the tool 30 in order to mechanically position the tool 30 in a proper fastening position relative to each module 14. A drive mechanism 28 is coupled to one of the base 24 and support 26 to provide relative movement between the base 24 and the support 26. If needed, a bottom gantry (not shown) having an alignment tool 25 is provided below the base 24 to position the spring units 10 relative to the frame sections 22 as shown in the '789 patent. In one illustrated embodiment, cable drive mechanisms are used to move the support relative to the base. See, for example, the cable drive mechanism illustrated in the '789 patent.

The spring unit 10 is constructed such that a stapler head 30 can approach the target at the bottom portion 20 of modules 14 in a direction perpendicular to the base 24 supporting the frame 21. Spring unit 10 has three features which simplify the stapling task. First, the dimensional tolerances of the target are very good. Second, the target can be approached perpendicular to the base 24. Third, a large access area is available.

As discussed above, the present invention provides a mechanical guide 32 coupled to the tool or stapler head 30. Mechanical guide 32 is used to steer the stapler head 30 to a target on bottom portion 20 of module 14 without the use of the vision guidance system of the '789 patent. The mechanical guide 32 therefore provides a lower cost guidance system. In addition, since the vision guidance system targets acquisition time is eliminated, the hit speed of the stapler 30 is increased. It is understood that the mechanical guide 32 may also be used with a vision guidance system. In this embodiment, the vision guidance is less exact in guiding the stapler 30 directly to the target as in the '789 patent, but could provide vision guidance to an initial position adjacent each module.

Figure 3:
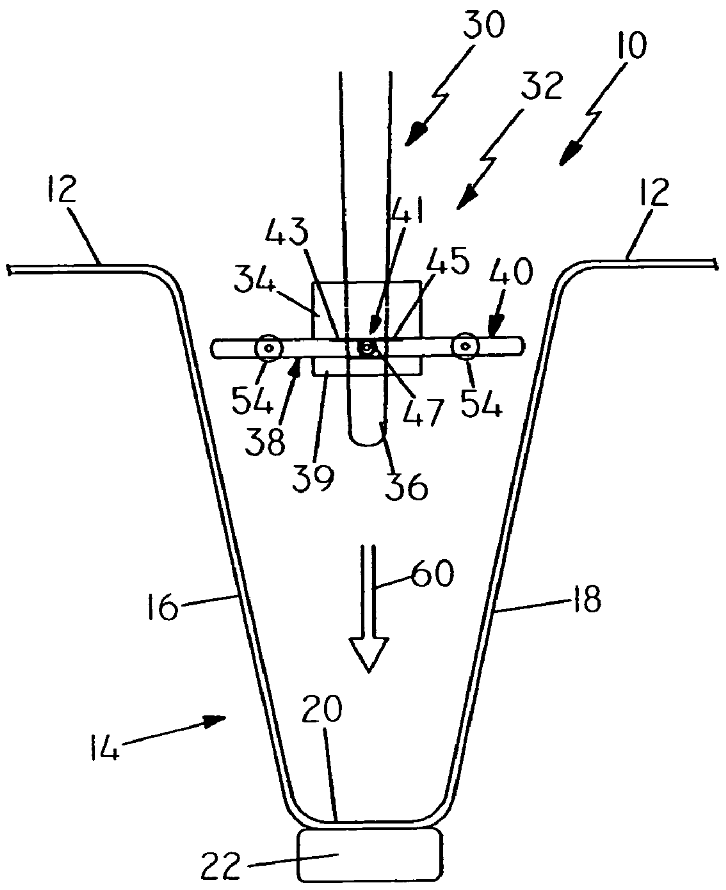
FIG. 3 is an end elevational view illustrating the stapler and mechanical guide advancing downward/toward a target on a portion of a module to secure a portion of the module to the frame.
Figure 4:
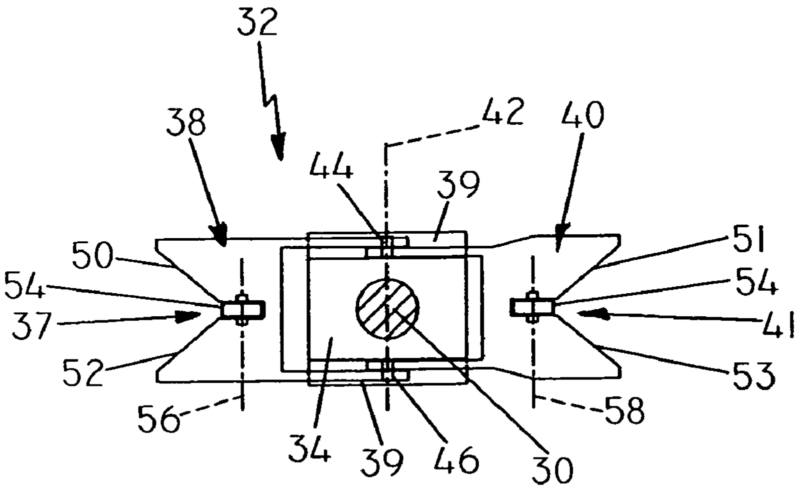
FIG. 4 is a sectional view taken through the stapler of FIG. 3 illustrating the mechanical guide in detail.

FIG. 3 illustrates position of stapler head 30 and mechanical guide 32 when the stapler head 30 moved into position between first and second vertically extending side portions 16 and 18 of spring module 14. As best shown in FIG. 4, mechanical guide 32 illustratively includes a support 34 attached to a nose 36 of stapler head 30. The guide 32 also includes first and second guide wings 38 and 40 which are pivotably coupled to support 34 about a pivot axis 42 by pivot connectors 44 and 46. Each of the guide wings 38 and 40 illustratively includes a V-shaped notched portion 37 and 41, respectively. Notched portion 37 of guide wing 38 is defined by ramp surfaces 50 and 52. Notched portion 41 of guide wing 40 is defined by ramp surfaces 51 and 53. In the illustrated embodiment, a wheel or roller bearing 54 is rotatably coupled to each guide wing 38 and 40 about pivot axes 56 and 58, respectively. It is understood that the wheels 54 may be omitted or replaced by low friction skids or other similar structure.

Figure 5:
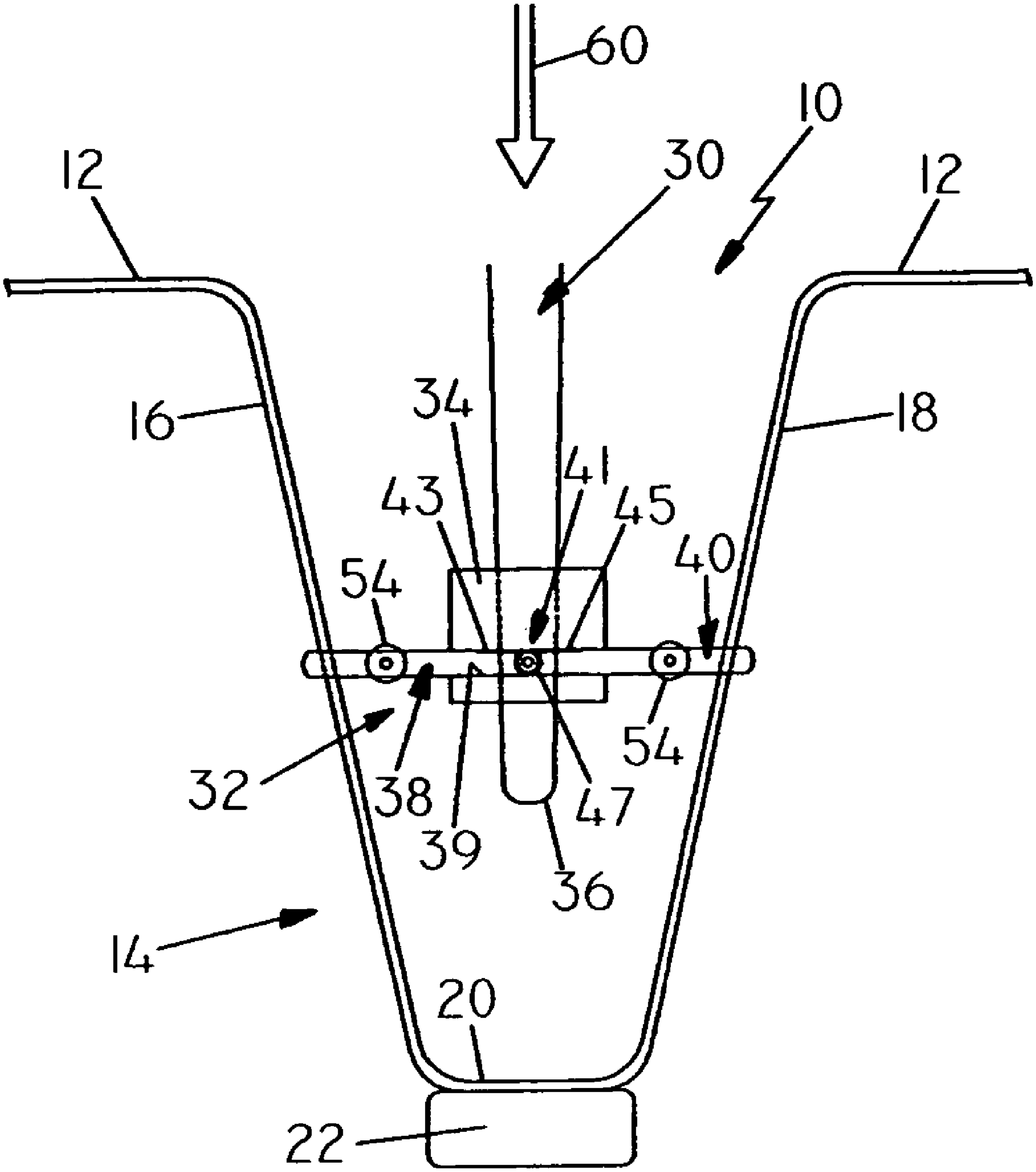
FIG. 5 is an end elevational view similar to FIG. 3 showing further movement of the stapler as the mechanical guide approaches opposite side portions of the module.

As stapler head 30 is moved downwardly in the direction of arrow 60 in FIG. 3, the stapler head 30 and guide 32 move to the position shown in FIG. 5. In FIG. 5, the wings 38 and 40 begin to approach vertically extending side portions 16 and 18, respectively. Ramp surfaces 50 and 52 of guide wing 38 and ramp surfaces 51 and 53 of guide wing 40 are configured to engage the wire and guide the stapler head 30 to a center position to align stapler head 30 with the target on bottom portion 20 as the stapler head 30 is moved downwardly. Depending upon the initial alignment of stapler head 30, various portions of ramp surfaces 50 and 52 or 51 and 53 engage the side portions 16 and 18, respectively. Because stapler head 30 is pivotably mounted to a support assembly as disclosed in the '789 patent, stapler head 30 can move as the wings 38 and 40 engage the downwardly extending portions 16 and 18.

Figure 6:
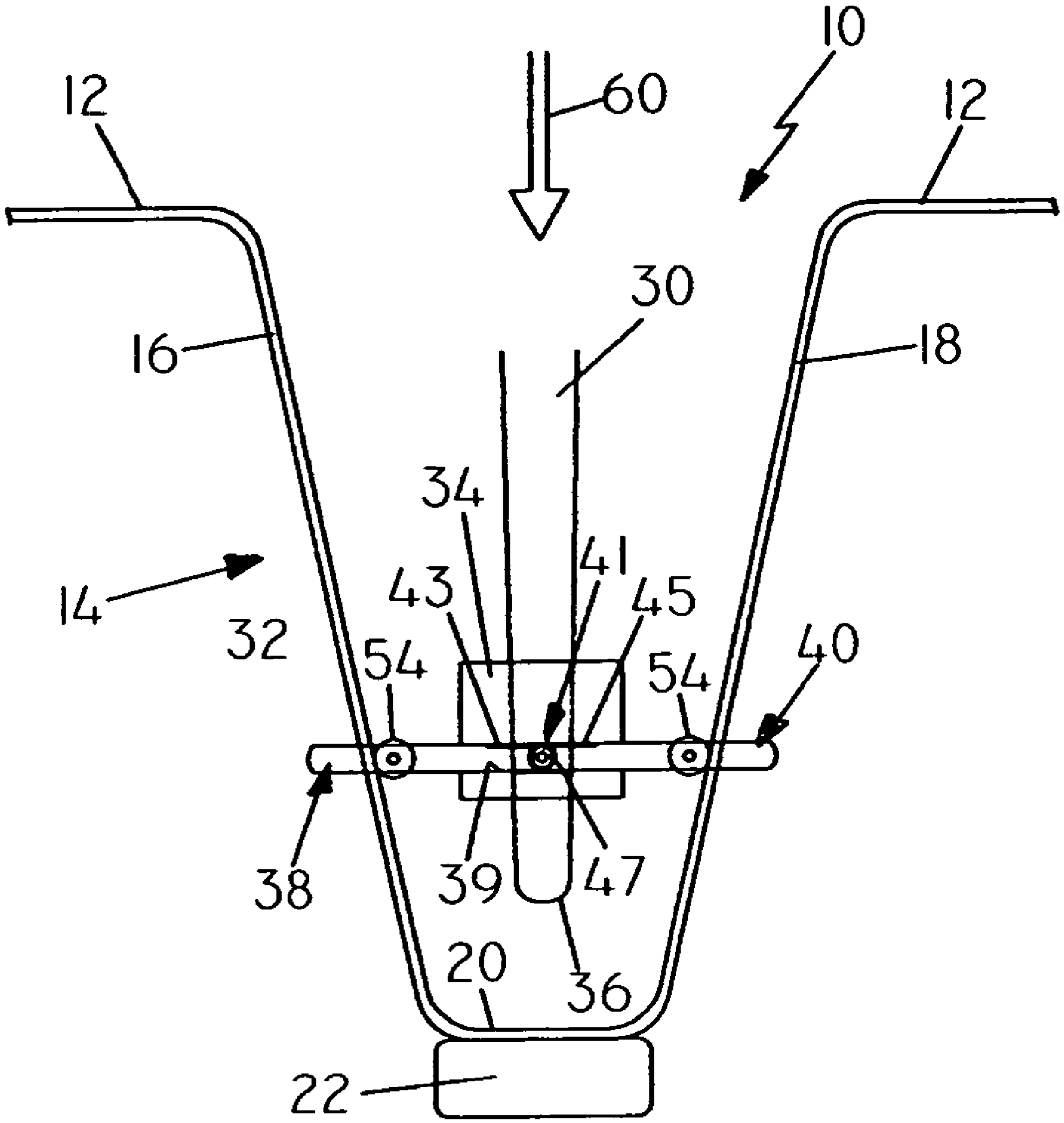
FIG. 6 is an end elevational view similar to FIGS. 3 and 5 illustrating engagement of the mechanical guide with opposite side portions of the module.

FIG. 6 illustrates the position of the stapler head 30 and the mechanical guide 32 when stapler head 30 is moved further in the direction of arrow 60 so that the rollers 54 engage the first and second side portions 16 and 18. When in the position of FIG. 6, the stapler head 30 is aligned with the target 20 since the stapler head 30 is centered between the side portions 16, 18. Rollers 54 reduce contact friction between the mechanical guide 32 and the wire forming side portions 16 and 18 to facilitate targeting.

Figure 7:
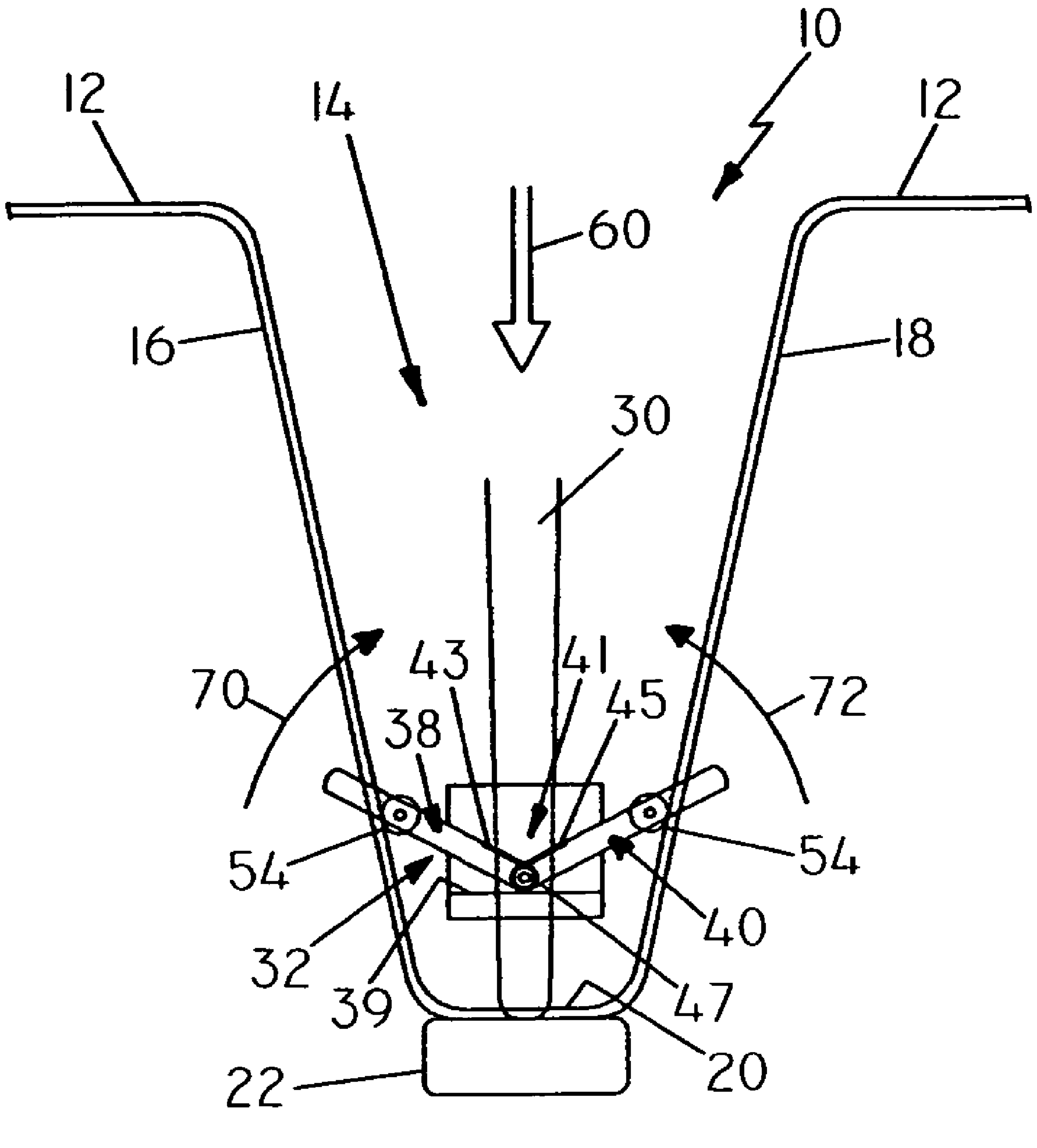
FIG. 7 is an end elevational view illustrating pivotable movement of portions of the mechanical guide relative to the stapler to guide the stapler into proper position to secure the module to the frame at the target.

As shown in FIG. 7, guide wings 38 and 40 pivot upwardly in the direction of arrows 70 and 72, respectively, as the stapler head 30 continues downward movement in the direction of arrow 60 and engages the target on bottom section 20. Left and right guide wings 38 and 40 are illustratively spring loaded by springs 41 located on opposite sides of support 34 so that the normal positioning of the guide 32 is the generally horizontal position shown in FIGS. 3, 5, and 6. Each spring 41 includes a first arm portion 43, a second arm portion 45, and a central coil portion 47. Central coil portion 47 extends along pivot axis 42. First arm 43 applies a downwardly directed force to guide wing 38. Second arm 45 applies a downwardly directed force to guide wing 40. Therefore, guide wings 38 and 40 are biased downwardly against stops 39 located on opposite sides of the support 34.

If one roller 54 contacts the wire element before the opposite side roller 54, the stapler head 30 is moved in an opposite direction from the contacted side. This movement continues until the roller 54 on the opposite side wing intersects the opposite side portion of the wire element. The spring forces applied by springs 41 to the guide wings 38 and 40 are great enough so that the guide wings 38 and 40 do not pivot upwardly until both guide wings 38 and 40 have engaged the side portions 16 and 18. Once both rollers 54 have contacted both side portions 16 and 18, the wings 38 and 40 begin to pivot upwardly about pivot axis 42. This provides forces needed to move the stapler head 30 to a point midway between the first and second portions 16 and 18, thereby targeting the stapler head 30 in a center of the bottom portion 20 of the wire element located on wood frame 22. This insures proper positioning of staples 80 shown in FIG. 2, or proper positioning of other suitable fasteners such as nails, glue, or the like.

In the illustrated embodiment of the present invention, a controller is a Cartesian robot structure made up of a work table having an X-axis and a Y-axis, an industry standard stapler (or other fastener), a stapler Z-axis drive system, a drive mechanism and a driver/controller system for each axis of motion. The stapler does not require the T-axis and U-axis drive motors disclosed in '789 patent. In addition, a stapler rotation motor is not required. Illustratively, the stapler is fixed in one rotary position relative to the target bottom portion 20 of the wire elements where the staples 80 are installed. The support 26 is illustratively held in a vertical position by four springs, one on each side of an upper portion of a mounting system. The springs allow movement of the support 26 as the guide 32 engages the vertically extending side portions 16 and 18 of the wire module 14. Therefore, as discussed above, the system of the present invention does not require vision guidance system to align the tool 30 with the target.

In operation, the standard position of each of the spring modules 14 relative to the frame 21 is programmed into the control system. The driver/controller moves the stapler head 30 to the pre-programmed standard positions and then moves the stapler head 30 downwardly to insert a stapler 80 or other fastener at the target locations to secure the bottom portions 20 to frame sections 22. As discussed above, vision guidance (generally shown as sensor 31 in FIG. 1) may be used to determine that the modules are in the standard positions and make sure that the tool 30 is initially aligned with the module 14. In another embodiment, magnetic sensors 31 are used to locate the upper portion of the wire. The magnetic sensors 31 are located adjacent the guide 32 and provide active feedback to the controller to move the stapler head 30 and guide 32 to the standard position over a module 14. However, the mechanical guide 32 provides final alignment of the stapler head 30 with the target bottom portion 20 during the stapling process as discussed above.

Although the present invention has been described in detail with respect to a box spring stapler apparatus, it is understood that other types of modules may be fastened in accordance with the present invention. In addition, various fastening tools may be used with the mechanical guide of the present invention other than the disclosed stapler. These tools include, for example, a nailer, a glue dispenser, or other fastening device.

It is understood that the mechanical guide 32 may also have a different structure to accomplish the alignment of the tool 30 with the fastening target. For example, in another embodiment, guide 32 is made from a flexible material that bends as it contacts the side portions 16 and 18 of the module 14. This flexible guide has the same shape as shown in FIG. 4, and is made from a flat piece of flexible material mounted to support 34. The material is illustratively a plastic material having good wear capability and flexibility. The material may also be metal with anti-friction pads located where the rollers 54 are located in FIG. 4. Rollers 54 are optional, but may be used if desired. This embodiment eliminates the hinged guide wings and related pivots and springs. The guide 32 is an integral one-piece guide made of flat, springy material with the same "V" shape on the ends.

Although the invention has been described in detail with reference to certain preferred embodiments, variations and modifications exist within the scope and spirit of the present invention as described and defined in the following claims.

What is claimed is:

1. An apparatus for securing a plurality of modules to a frame, the apparatus comprising:

a base for supporting a frame and a wire grid including a plurality of modules;

a support;

a drive mechanism coupled to at least one of the support and the base, the drive mechanism being configured to provide relative movement between the support and the base;

a controller coupled to the drive mechanism;

a tool coupled to the support, the tool being configured to secure each module to the frame;

at least one sensor configured to locate a portion of the wire grid without the use of a vision guidance system, the at least one sensor providing feedback signals to the controller; and a mechanical guide coupled to the tool, the mechanical guide being configured to engage the module as the tool and the mechanical guide move relative to the module so that the tool and the module are aligned at a target fastening location.

2. The apparatus of claim 1, wherein the controller is configured to guide movement of the support relative to the base and the frame and modules located on the base, thereby moving the tool to secure each of the modules to the frame.

3. The apparatus of claim 2, wherein the controller includes a memory for storing a plurality of standard positions for each of the modules on the frame and means for guiding the tool to the plurality of stored standard positions.

4. The apparatus of claim 2, wherein the controller is programmable to accommodate a plurality of different module positions.

5. The apparatus of claim 1, wherein the tool is pivotably coupled to the support.

6. The apparatus of claim 1, wherein the tool is one of a stapler, a nailer, and a glue dispenser.

7. The apparatus of claim 1, wherein engagement of the mechanical guide with the module causes relative movement between the tool and the module.

8. The apparatus of claim 1, wherein each module is formed by a wire having a top portion spaced apart from the frame, first and second vertically extending side portions, and a bottom portion located on the frame, the mechanical guide being configured to engage at least one of the first and second vertically extending side portions as the tool and the mechanical guide move relative to the module.

9. The apparatus of claim 8, wherein the first and second vertically extending side portions are each aligned at an angle relative to the bottom portion to provide a generally V-shaped module.

10. The apparatus of claim 1, further comprising an alignment tool located adjacent the base, the alignment tool being configured to position the modules relative to the frame.

11. The apparatus of claim 1, wherein the mechanical guide is an integrally formed guide.

12. The apparatus of claim 1, wherein the mechanical guide is made from a plastic material.

13. The apparatus of claim 1, wherein the mechanical guide includes first and second notched portions configured to engage first and second side portions of the module, respectively, the notched portions of the mechanical guide being formed from a low friction material.

14. The apparatus of claim 1, wherein tool is a stapler having an elongated stapling head, the stapling head including a distal end configured to deliver staples to the target fastening location, the mechanical guide being coupled to the stapling head adjacent the distal end.

15. The apparatus of claim 1, wherein the at least one sensor to locate portions of the wire grid is a magnetic sensor.

16. An apparatus for securing a plurality of spring modules to a frame to form a box spring, the apparatus comprising:

a base for supporting a frame and a wire grid including a plurality of spring modules;

a support;

a drive mechanism coupled to at least one of the support and the base, the drive mechanism being configured to provide relative movement between the support and the base;

a tool coupled to the support, the tool being configured to secure each module to the frame;

a controller coupled to the drive mechanism;

at least one sensor configured to locate a portion of the wire grid without the use of a vision guidance system, the at least one sensor providing feedback signals to the controller; and means for mechanically aligning the tool with the module as the tool moves toward the module to position the tool at a target fastening location on the module so that the tool secures each spring module to the frame.

17. A method of forming a portion of a box spring or mattress foundation, the method comprising:

providing a base;

locating a wood frame on the base, the wood frame including a plurality of spaced apart, generally parallel frame sections;

locating a wire grid including a plurality of modules arranged in a plurality of rows on the frame, each row including a plurality of modules formed from a continuous metal wire with each module having a top portion spaced apart from the frame, first and second side portions extending downwardly from the top portion, and a bottom portion connecting the first and second side portions, the bottom portion being positioned on one of the frame sections;

locating a stapler above the base;

providing a mechanical guide on the stapler;

sensing the location of a portion of the wire grid without the use of a vision guidance system;

moving the stapler and the mechanical guide relative to the base, the mechanical guide engaging the module so that both the stapler and the module are aligned at a target fastening location on the frame section; and inserting a staple from the stapler over the bottom portion the module and into the frame section at the target fastening location.

18. The method of claim 17, wherein mechanical guide includes first and second portions configured to engage the first and second side portions of the module, respectively, as the mechanical guide moves relative to the module.

19. The method of claim 17, wherein engagement of the mechanical guide with the module during the moving step causes relative movement between the stapler and the module.

20. The method of claim 17, wherein the stapler includes an elongated stapling head, the stapling head including a distal end configured to deliver staples to the target fastening location, the mechanical guide being coupled to the stapling head adjacent the distal end.

* * * * *